UNITED STATES PATENT OFFICE.

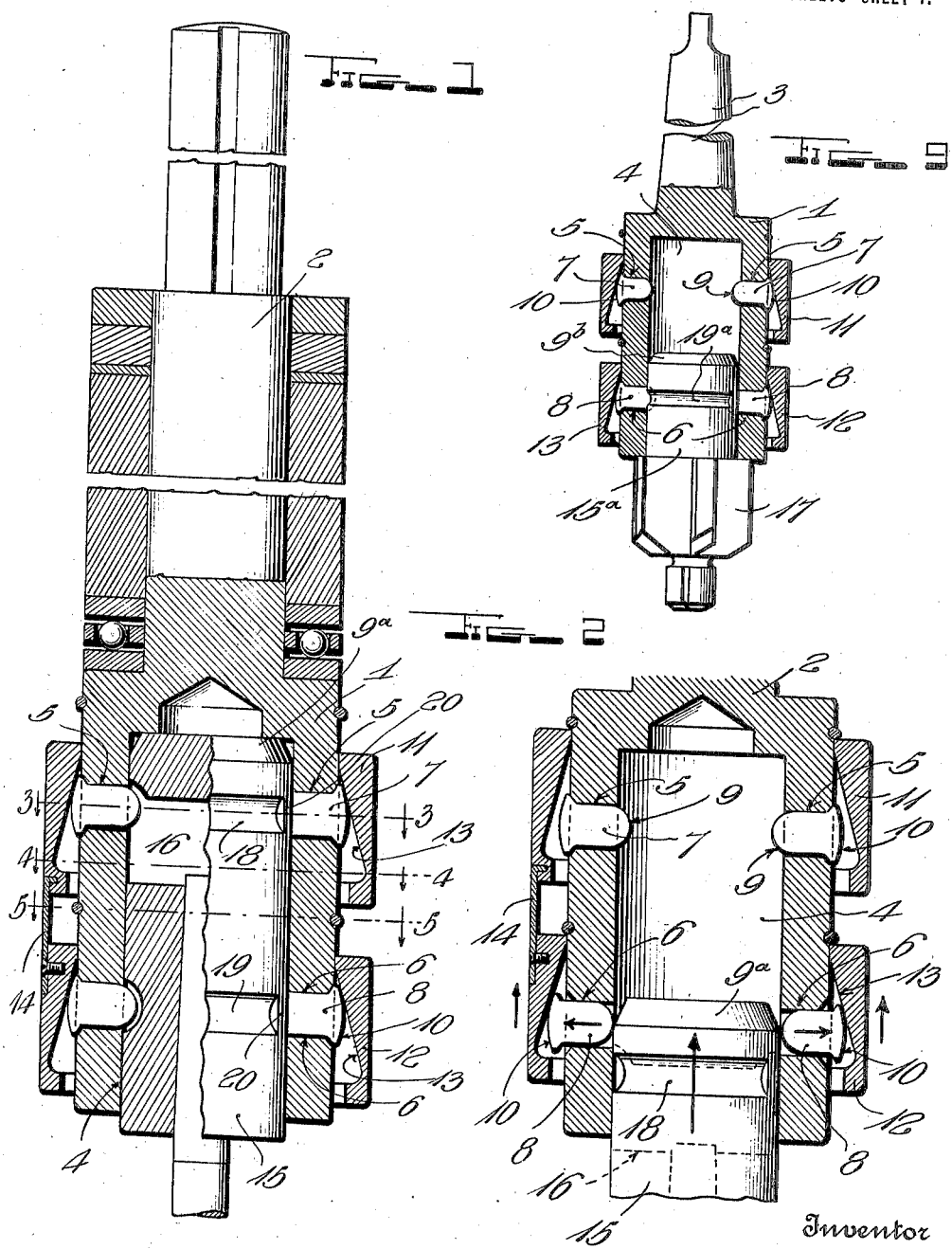

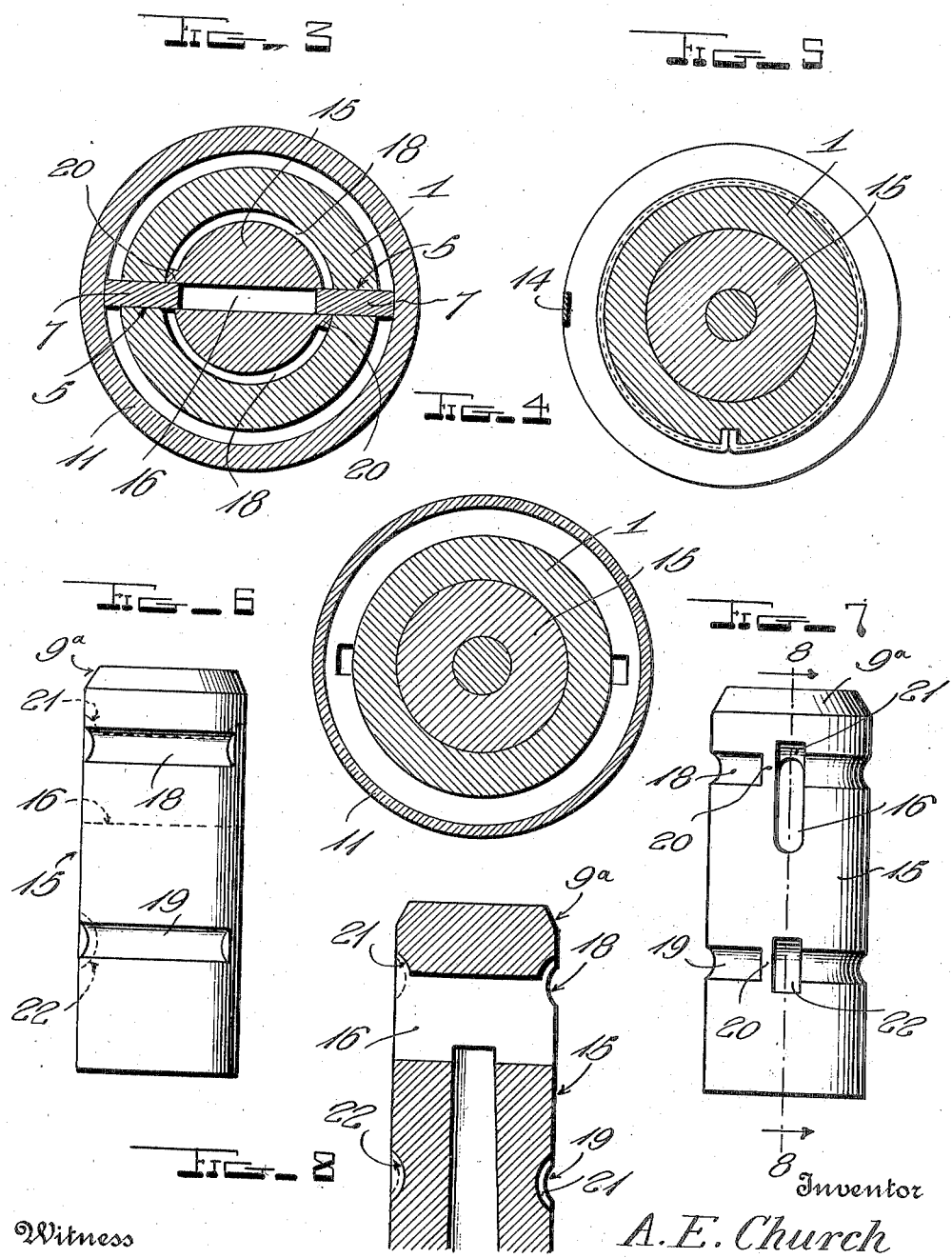

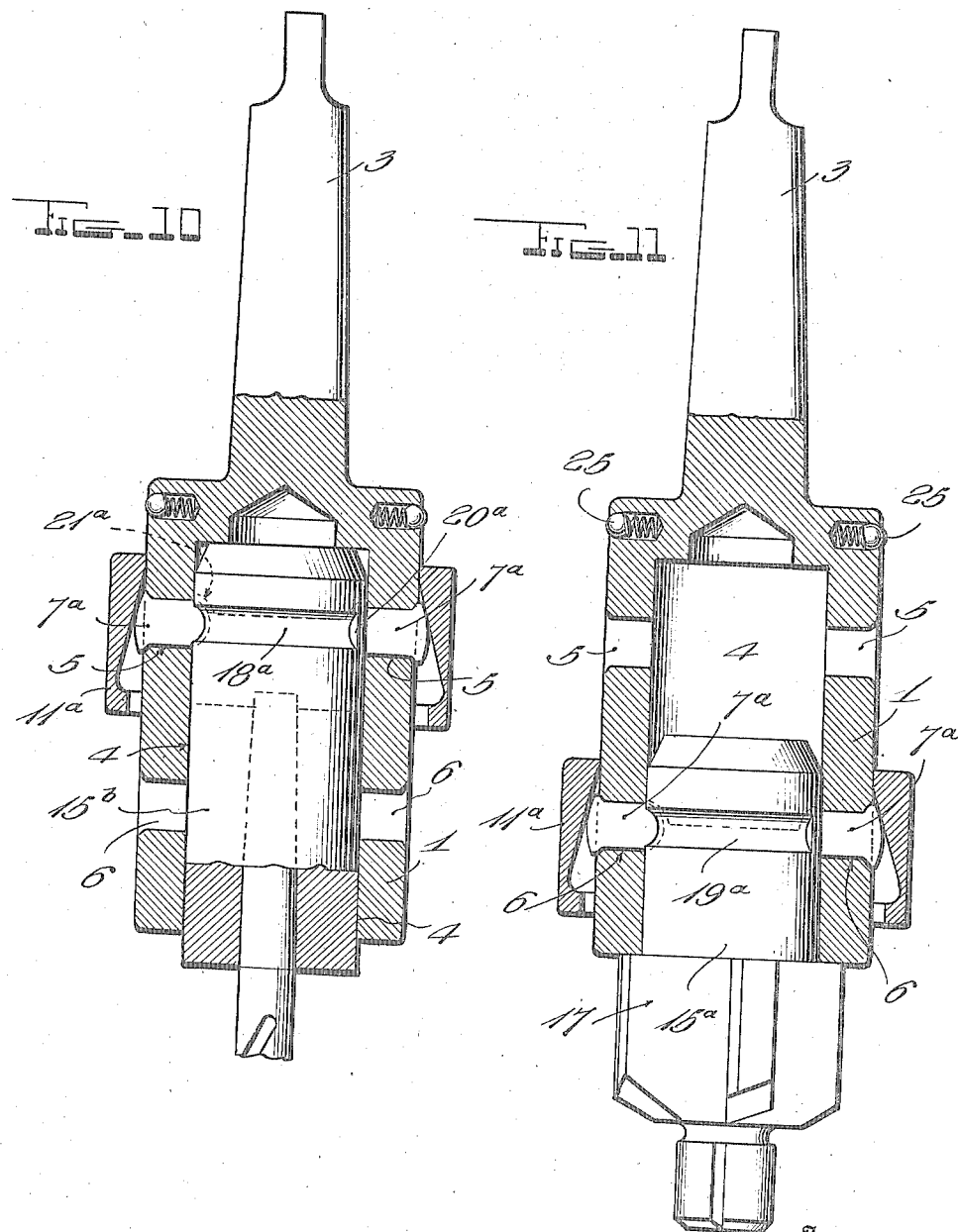

ALBERT EDWARD CHURCH, OF NEW BRITAIN, CONNECTICUT.

DRILL-PRESS CHUCK.

1,345,583.

Specification of Letters Patent.   Patented July 6, 1920.

Application filed February 24, 1919.   Serial No. 278,881.

*To all whom it may concern:*

Be it known that I, ALBERT E. CHURCH, a citizen of the United States, residing at New Britain, in the county of Hartford and State of Connecticut, have invented certain new and useful Improvements in Drill-Press Chucks; and I do declare the following to be a full, clear, and exact description of the invention, such as will enable others skilled in the art to which it appertains to make and use the same.

My invention has for its principal object to provide a chuck for drill presses and other machines, provided with double acting means for retaining and driving the tools, the device being of such construction as to necessitate only a single operation in inserting a tool; namely; a forcible thrust of the tool into the chuck.

In carrying out the above end, a further object is to construct the butt end of the tool in a novel manner for co-action with the tool retaining and driving key or keys.

When collets are used, another object is to employ the usual drift slots thereof for co-action with one or more of the above mentioned keys.

A still further object is the provision of two sets of the aforesaid keys and individual collars for controlling them, together with means for detachably connecting said collars so that they may be either moved bodily or individually, according to the construction of the tool used.

Yet another object is to provide a chuck integral with the driving spindle, of the machine on which it is used, whereby to reduce vibration, relative slippage, eccentric rotation, etc.

With the foregoing in view the invention resides in the novel features of construction and unique association of parts fully described and claimed.

Figure 1 is a vertical longitudinal section with parts in elevation, showing one form of the chuck and illustrating the manner in which is may be integrally joined to the spindle of the machine on which it is used.

Fig. 2 is a view similar to Fig. 1 illustrating the movements of parts which occur when a tool is forced into the chuck.

Figs. 3, 4 and 5 are horizontal sections on the planes indicated by the lines 3—3, 4—4 and 5—5 respectively of Fig. 1.

Figs. 6 and 7 are elevations of the form of collet used, and Fig. 8 is a sectional view thereof on the plane of the line 8—8 of Fig. 7.

Fig. 9 is a vertical longitudinal section of a chuck differing from that of Fig. 1, in that the connecting means for the two collars is eliminated and the chuck is not integral with the spindle of the machine.

Fig. 10 is a longitudinal section of a still further form of the invention showing the manner in which a different form of collet or long tool shank may be held therein, and Fig. 11 is a view similar to Fig. 10 but illustrating the manner of holding a short tool shank in the chuck.

In the drawings above briefly described, the numeral 1 designates a chuck head which is by preference of cylindrical formation, said head being either formed integral with the spindle 2 of the machine on which it is used, or having the usual tapered shank 3 to be forced into the well known tubular socket in the spindle. When the head and spindle are integrally formed as in Fig. 1, there is no possibility of excessive vibration as now commonly occurs, all slippage of the tools or chuck head is prevented, and any eccentric movement on the part of the latter is prevented; and for these reasons this form of construction will be preferable wherever it may be used without necessitating numerous changes in the construction of the drill press or the like. For instance, when the complete machine including the spindle and chuck, is constructed at the same factory, the integral construction may be followed, but when the chucks are marketed for use with machines already on the market, the tapered spindle 3 will be employed.

The head 1 is provided with a longitudinal socket 4 adapted to receive therein the shank of a tool, or a collet, and the construction of the locking means for retaining such shank or collet, in place and for driving the same, is such as to require only an upward thrust of the tool into the socket in order to insert the former into the latter and retain it in operative position therein.

An inner and an outer set of radial guide openings 5 and 6 respectively are formed in the head 1, the openings of each series being by preference diametrically opposed to each other as shown, and although two inner openings 5 and a corresponding number of outer openings 6 are shown, it is to be understood that any adequate number may be employed. Inner and outer tool driving and retaining keys 7 and 8 are slidably positioned in the openings 5 and 6 respectively, reference being made to all forms of the invention except that disclosed in Figs. 10 and 11, which will be described hereinafter. The keys 7 and 8 have rounded inner ends 9 projecting normally into the socket 4 and rounded T-heads 10 which limit the inward projection of the keys, said T-heads being by preference countersunk to a slight extent in the periphery of the head 1, when the keys are projected inwardly to driving position.

Collars 11 and 12 are slidable on the head 1 and cover the keys 7 and 8 respectively, said collars being internally tapered to provide cam surfaces 13 for co-action with the rounded edges of the T-heads 10, which edges form additional cam surfaces for a purpose to appear. The two collars may be connected for movement bodily by any preferred means such as that indicated at 14 in Fig. 1 and when such means is released, independent movement of said collars is allowed. In most cases, however, the connection 14 may be eliminated as will be seen by reference to Fig. 9.

The shanks of most of the tools to be inserted in the chuck, and the formation of the collets to be used therein, are practically identical so that in most figures of the drawings, I have merely detailed one of the collets 15. It is to be understood, however, that the description of this collet with the exception of the part thereof relating to the drift slot 16, may refer also to the butt end or shank of any other form of tool; and it may be further pointed out that short shanked tools such as the counterbore 17 of Figs. 9 and 11, may be employed, and that their construction is somewhat different as will be hereinafter fully set forth.

With the exception of its external construction, the collet 15 is the same as now commonly employed in everyday use, but the periphery of said collet, at the inner end thereof, is beveled at $9^a$ to engage the rounded inner ends 9 of the keys 7 and 8, and the exterior of the collet is provided with longitudinally spaced grooves 18 and 19 which extend substantially throughout its circumference as will be clear from Figs. 3, 6, 7 and 8, said grooves being adapted to receive the rounded ends of the keys 7 and 8 when the collet is inserted, and to guide such keys to the driving shoulders 20 which are integral with the collet and extend across the grooves at diametrically opposite points. In addition to this formation, the collet is provided with peripheral pockets 21 and 22 of greater depth than the grooves 18 and 19, adapted to receive the rounded inner ends 9 of the keys when the collet and chuck have been relatively turned to the proper extent, which takes place before the chuck will start to drive the tool. The pockets 21 are shown merging into the drift slot 16 so that the latter may partially receive the keys 7, and in some forms of the device, said drift slot might be utilized as the sole means for receiving said keys. In either instance, the additional cutting of metal which would otherwise be necessary, is obviated.

As illustrated in Fig. 9, only the outer keys 8 come into play when driving a short shanked tool, the shank being indicated at $15^a$. The inner end of the shank $15^a$ is beveled at $9^b$, and this shank is provided with a peripheral groove $19^a$, and with pockets and driving shoulders such as those above described, for co-action with the keys 8. The tool 17 with its shank $15^a$ is illustrated in Fig. 11, in addition to Fig. 9, and a different form of collet $15^b$ is disclosed in Fig. 10. This collet and correspondingly long tool shanks, may if desired be provided with only one peripheral groove such as $18^a$ and with only one set of key engaging pockets $21^a$ and driving shoulders $20^a$. Also, the inner end of the collet or shank will be beveled in the same manner as above described. This form of tool may well be used with a chuck having one set of keys $7^a$ receivable within the inner openings 5 or the outer openings 6, according to the length of the tool shank. For instance, Fig. 10 which discloses the collet $15^b$ in place, illustrates the keys $7^a$ in the inner openings 5 and received in the pockets $21^a$, while Fig. 11, disclosing the short shank $15^a$ in place, shows the keys $7^a$ transferred to the lower guide openings 6. A single collar $11^a$ serves to hold the keys in driving position in either instance, the keys and collar being of the same construction as the corresponding parts above described, so that further description thereof is unnecessary. It may be additionally set forth, however, that when the keys $7^a$ are being transferred from one set of guide openings to the other, the collar is pushed up over the spring pressed balls 25 until the change is made, after which it is returned into proper working relation with the keys.

All forms of the device operate in the same manner when the tool is inserted, regardless of the design of the latter. It is simply necessary to forcibly thrust the tool butt into the socket 4. When the beveled end of the tool comes in contact with the rounded inner ends of the keys, these keys are forced radially outward as indicated by the arrows in Fig. 2, and in moving in this manner, the rounded T-heads 10 of said keys thrust against the cam surfaces 13, thus driving the key retaining collar or collars to an inoperative position, in which position they will remain until the tool is entirely inserted. When this occurs, however, the collar or collars return toward their initial positions, thus forcing the rounded ends of the keys into the peripheral slot or slots in the tool. When now the tool and socket are relatively turned the keys are brought up against the driving shoulders and at the same time are allowed to enter the peripheral pockets provided therefor, said keys being forced into the pockets by complete return of the collar or collars to key locking position.

I attach great importance to the following: Only one operation is necessary to insert a tool into the chuck, the retaining collar or collars being automatically moved to inoperative position by this operation, instead of requiring manual movement as is necessary with some types of chucks now on the market; the keys serve the two-fold function of driving the tool and retaining it in the socket until the collar or collars are raised, upon which the tool will drop freely from the chuck; the construction of the butt end of the tool, whether this end be in the form of a collet or an integral part of the tool body, is constructed so as to allow the keys to retain the tool in the chuck without the necessity of alining the peripheral pockets with the keys at the insertion; the usual drift slots of collets which commonly receive the drift wedge to drive the drill shanks or the like therefrom, are employed to receive the driving keys; the two collars may be connected for movement bodily or for individual movement in some forms of the device; the chuck head and the spindle of the machine on which it is used may be formed integrally; and the device, in any of its embodiments, is comparatively simple and inexpensive, yet is in all ways highly desirable and efficient.

Since probably the best results are obtained from the several features disclosed, they may well be followed, but it is to be understood that within the scope of the invention as claimed, the device may be embodied in other forms and that numerous changes may well be made over the specific construction illustrated.

I claim as my invention:

1. In a chuck, a head having a tool receiving socket, a tool driving key movable in said head and projecting normally into said socket, said key being retractible by the forcible insertion of a tool, and key released means for retaining said key in driving position, said retaining means being movable to released position by insertion of the tool and being self-returned to operative position when the tool is completely inserted.

2. In a chuck, a head having a socket to receive a tool, a tool-driving key, slidable radially in said head and extending from the periphery thereof into one side of said socket, the projecting inner end of said key having a cam surface for forcing said key outwardly when a tool is forced into the socket, a key-released, self-returning, key-locking collar slidably surrounding said head and covering said key, and coacting cam means on said key and collar for first, sliding said collar along said head to released position when the key is forced outwardly by insertion of the tool; second, for returning said key to its initial position when the tool is fully inserted and the collar returns to its original position; and third, for retaining said key in operative relation with the tool until said collar is released by hand.

3. In a chuck, a head having a tool socket, inner and outer tool-driving keys mounted in said head, a pair of collars slidably surrounding said head for operating said inner and outer keys respectively, and means for detachably connecting said collars, whereby they may move either bodily or individually.

4. In combination, a collet having the usual drift slot, a chuck adapted to receive said collet, and a collet retaining and driving key carried by said chuck and receivable in said drift slot.

5. In combination, a chuck head having a tool socket, a tool retaining and driving key mounted in said head, means for retaining said key in operative position and for permitting retraction thereof when a tool is inserted in said socket; together with a tool having a groove extending approximately throughout its circumference to receive the key when the tool is first inserted in the socket, said tool having a driving shoulder extending across said groove to engage said key when said tool and head are relatively turned.

6. In combination, a chuck head having a tool socket, a tool retaining and driving key mounted in said head, and means for retaining said key in operative position and for permitting retraction thereof when a tool is inserted in said socket; together with a tool having a groove extending approximately throughout its circumference to receive the key when the tool is first inserted in the socket, said tool having a driving shoulder extending across said groove to engage said key when said tool and head are relatively turned, and also having a peripheral pocket of greater depth than the groove to receive the key when the latter is in driving contact with said shoulder.

7. A tool as herein described having a groove extending approximately thoughout its circumference to receive a tool driving and retaining key when the tool is first inserted in a chuck, said tool having a driving shoulder extending across the groove for driving contact with the key when the tool and chuck are relatively turned.

8. A tool as herein described having a groove extending approximately throughout its circumference to receive a tool driving and retaining key when the tool is first inserted in the chuck, said tool having a driving shoulder extending across the groove for driving contact with the key when the tool and chuck are relatively turned and also having a peripheral pocket of greater depth than the groove to receive the key when the latter is in driving contact with the shoulder.

In testimony whereof I have hereunto set my hand.

ALBERT EDWARD CHURCH.

Witnesses:
M. A. TAYLOR,
CARL S. MUELLER.